United States Patent Office 3,484,409
Patented Dec. 16, 1969

3,484,409
PROCESS FOR PREPARING POLYVINYL FORMAL
Tadao Ashikaga, Hirotoshi Kurashige, and Takeo Endoh, Kurashiki, Japan, assignors to Kurashiki Rayon Co., Ltd., Kurashiki, Japan
No Drawing. Filed Oct. 21, 1965, Ser. No. 500,160
Claims priority, application Japan July 8, 1965, 40/41,035
Int. Cl. C08f 27/20
U.S. Cl. 260—73          2 Claims

ABSTRACT OF THE DISCLOSURE

A process for preparing polyvinyl formal having a degree of formalization of between 50 and 90 molar percent comprising reacting polyvinyl alcohol with formaldehyde in an acidic aqueous medium containing metal chloride in an amount of 15 to 50 weight percent. Also the high molecular weight polyvinyl formal having a degree of formalization between 50 and 90 molar percent being characterized by substantially no cross-linking and having solubility in ethylenediamine, dimethyl sulfoxide, dimethyl formamide, a mixture of dioxane and water, and a mixture of tetrahydrofuran and water.

The present invention relates to an improved process for preparing polyvinyl formal having good solubility for solvents and the solution thereof. More particularly, it concerns to a process for preparing polyvinyl formal having good solubility for several solvents, which is characterized by conducting the formalization in a reaction system composed of at least one metal chloride selected from the group consisting of chlorides of bi-valent or tri-valent metals such as zinc chloride, aluminum chloride, stannous chloride and magnesium chloride, polyvinyl alcohol (hereinafter referred as to PVA), formalization catalyzer, formalization agent, and water.

Polyvinyl formal (hereinafter referred to as PVF), especially PVF having an increased degree of formalization, possesses a prominent capacity that is adaptable for several uses as a synthetic resin, but actually it is not practically used except for wirecoating, and accordingly the demand for this resin is relatively small. The reason of its restricted use is due to the fact that in the prior art methods for preparing PVF it has been difficult to increase the degree of formalization thereof, the upper limit of the degree being about 80%, and furthermore its solubility for solvents has been very poor. This tendency to solubility becomes worse with the increase of the degree of formalization thereof. Thus, there has not been found any suitable solvent for PVF prepared by the prior art methods, due to its poor solubility, and this has been the principal reason why the use of PVF remained in a small quantity. Therefore, if it could be possible to prepare PVF, which has an improved degree of formalization and a good solubility, in an economically profitable manner, it is considered that PVF may be used for several purposes, such as films, sheets, boards, belts, construction materials for example wall-board, cellulose materials (sponge) viscosity-increaser, fillers and artificial leathers, and the demand thereof may be increased to considerable extent.

The inventors have now accomplished the present invention, as the result of several investigations to attain the purpose that PVF with an improved degree of formalization and a good solubility should be prepared by an economically profitable process, as aforementioned.

Processes currently used for the economical synthesis of PVF comprise a formalization reaction which is conducted in a reaction system composed of PVA, formalization catalyzer, formalization reagent and water, wherein said formalization is carried out in a consistent heterogeneous system, or it is carried out in a homogeneous system at the outset and in a heterogeneous system in the latter half. In such processes to prepare PVF, the formalization reaction is carried out in a consistent heterogeneous system or in a partially heterogeneous system, so that it is very difficult to raise the degree of formalization to a high extent, said degree of formalization being approximately 80% at most, and accordingly it has been impossible to prepare PVF having high degree of formalization.

Furthermore, PVF prepared by the prior art processes was inferior in the solubility for solvents. That is to say, PVF obtained by the usual processes, even in the case of a low degree of formalization of from 40 to 50%, has been inferior in the solubility for solvents, and particularly, when its degree of formalization is higher, its solubility becomes worse.

The inventors have considered that the low solubility of PVF prepared by the usual processes is due to the acetal bond between the molecules, namely the cross-linkage between the molecules. For instance, PVF prepared by usual processes which has a degree of formalization between 40 molar percent and 80 molar percent, is completely insoluble for several solvents, such as aqueous solution of thiocyanates, ethylenediamine, a concentrated aqueous solution of surface active agents, dimethyl sulfoxide, dimethyl formamide, mixed solution of dioxane and water, mixed solution of tetrahydrofuran and water, and other solvents, or otherwise it exhibits merely slight swelling for these solvents, without complete solubilization.

According to the present invention, at least one metal chloride selected from the group consisting of bi-valent and tri-valent metal chlorides such as zinc chloride, stannous chloride and others, is introduced into the reaction system composed of PVA, formalization catalyzer, formalization reagent and water, which was used in the prior art methods, and consequently the formalization reaction is conducted in the presence of a metal chloride.

According to the process of the present invention, the formalization reaction is carried out and completed under the condition of a consistent homogeneous system, owing to the solubilizing effect of said metal chloride for PVF, and furthermore said metal chloride has a catalytic effect for the acetal reaction. As the result of these characters, under the preferred conditions, PVF of a high degree of formalization may be prepared without difficulty. That is to say, under the preferred conditions, it is possible to prepare PVF which has a high degree of formalization, such as a degree of from 80 to 90 molar percent.

Furthermore, PVF prepared by the process of the present invention has a superior solubility for solvents. For example, all of the PVF prepared by the process according to the present invention, which possess high degree of formalization such as those between 70 and 90 molar percent, could be completely dissolved into several solvents such as aqueous solution of thiocyanates, ethylenediamine, concentrated aqueous solutions of surface active agents, dimethylsulfoxide, dimethylformamide, mixed solutions of dioxane and water, mixed solutions of tetrahydrofuran and water and other solvents.

The inventors have considered that the high solubility of PVF prepared by the process of the present invention is due to the fact that the chlorides of bi-valent or tri-valent metals have a capacity to cut off the acetal bond between the molecules and accordingly all the PVF prepared by formalization in the presence of these metal chlorides have no cross-linkage between the molecules.

PVA, which may be used in the present invention, comprises all kinds of PVA, such as completely saponified PVA, partially saponified PVA; PVA having various degress of polymerization such as high degree, medium degree or low degree, PVA polymerized at a low temperature, PVA of high stereoregularity, PVA containing some additives, partially acetalized PVA, partially aminoacetalized PVA, partially sulfoacetalized PVA, partially etherified PVA, partially urethanized PVA and other modified PVA, namely PVA derivatives.

As the formalization agent for PVA, use may be made of formaldehyde and its aqueous solution or formalin, as well as formaldehyde forming substance such as paraformaldehyde.

The formalization catalyzer, which can be used in the process, comprises all kinds of acids, for instance, mineral acids such as hydrochloric acid, sulfuric acid, phosphoric acid and others, as well as organic acids such as formic acid, acetic acid and others, among which hydrochloric acid and sulfuric acid are preferred.

As the chlorides of bi-valent and tri-valent metals which can be used in the present invention, mention may be made of zinc chloride, aluminum chloride, stannous chloride, barium chloride, magnesium chloride, calcium chloride, ferrous chloride, ferric chloride, cupric chloride and other chlorides. Among them, the most effective metal chloride, which is also the most profitable for the process of the present invention, is zinc chloride.

In the process of the present invention, in place of bi-valent or tri-valent metal chlorides, the inventors can use oxides, hydroxides or carbonates of bi-valent or tri-valent metals, together with hydrochloric acid. For example, in place of zinc chloride, the inventors can use combinations of zinc oxide and hydrochloric acid, zinc hydroxide and hydrochloric acid, as well as zinc carbonate and hydrochloric acid. In these cases, zinc chloride is formed and present in the reaction system, and accordingly said cases are included in the scope of the process according to the present invention.

In the process of the present invention, some amount of surface active agents, dyestuffs, pigments, coloring agents such as titanium dioxide, inorganic salts such as Glauber's salt and sodium chloride, water soluble organic compounds such as methanol, ethanol, isopropyl alcohol and acetone, foaming agents and other additives may be introduced into the formalization reaction system depending upon the demands.

As the phase condition in the formalization system according to the present invention, use may be made of various conditions. The formalization may be conducted in various reaction systems as follows: (1) in the consistent, completely homogeneous solution state, namely in the completely homogeneous system throughout the total reaction period, (2) in the complete heterogeneous system throughout the total reaction period, (3) in the completely homogeneous system in the outset of the reaction period and in the completely heterogeneous system in the latter half, (4) in the completely homogeneous system in the outset of the reaction period and in the partially homogeneous and partially heterogeneous system in the latter half. The process according to the present invention may be conducted in each of the aforementioned phase conditions, but it is considered that the most profitable phase condition to conduct the formalization is the complete homogeneous system, wherein the degree of formalization can be raised to high extent without any difficulty.

In the process of the present invention, the phase condition in the formalization system as aforementioned may be varied depending upon the following factors, such as the kind of metal chloride, the concentration of said metal chloride, the concentration of formalization catalyzer (acid) and the degree of formalization in the PVF obtained by the process, and accordingly said phase condition can not be defined absolutely. But, in general, the phase condition of the reaction system becomes to a complete homogeneous system, when a metal chloride having a good solvent effect for PVF is used in the reaction, the concentrations of metal chloride and of formalization catalyzer are increased and the degree of formalization of PVF, which is the final objective matter, is decreased. On the contrary, when a metal chloride having an inferior solvent effect for PVF is used in the reaction, the concentrations of metal chloride and of formalization catalyzer are low and the degree of formalization of PVF is increased in the final objective matter, the phase condition of the reaction system becomes a completely heterogeneous system. In case of the intermediate condition of the aforementioned two cases, the phase condition also becomes to the intermedaite state. As an example of the first case, when zinc chloride having a good solvent effect for PVF, is used and the concentration of said metal cloride is increased more than the amount of about 30% by weight per total reaction system, the reaction may be conducted in a consistent and completely homogeneous system and the phase condition of the system after the reaction is kept as a completely homogeneous solution, even if the degree of formalization is increased to a high extent. As an example of the second case, when calcium chloride having an inferior solvent effect for PVF, is used, the reaction is carried out in phase conditions of a consistent and complete heterogeneous system. As an example of the third case, when staneous chloride having the intermediate character of the aforementioned two metal chlorides, is used in an amount of from 25 to 30% by weight per total reaction system, the reaction is carried out in phase conditions of an intermediate system, that is to say, the outset of the reaction being under conditions of completely homogeneous systems and the latter half of the reatcion being under conditions of a partially heterogeneous system and partially homogeneous system.

As above mentioned, according to the process of the present invention, it is possible to conduct the reaction in a phase condition of completely homogeneous system throughout the reaction period, and, in this case, PVF is obtained as a homogeneous solution. The solution thus obtained may be used for various molding as such. This is one of the distinctive advantages of the present process, so that the resultant solution of PVF is directly applied for subsequent uses, such as a spinning solution, but it is also generally possible to recover as solid PVF.

The resultant solution after the formalization, may be contacted with water, warm water, hot water, steam, acidic solution, aqueous solution of metal chlorides used in the reaction or a mixture of said solution with an acid, whereby the resultant PVF is coagulated completely, and then washed with water, followed by drying and crushing The finished product is obtained as solid PVF in form of flake, granule, mass or powder.

In the coagulating step of PVF as above described, the resultant solution is usually contacted with an aqueous coagulating bath under vigorous stirring and at a suitable temperature. According to the process of the present invention, the concentration of metal chlorides in the formalization system is usually between 5% and 65%, but it is preferable to use a concentration of from 15% to 50%.

As to the degree of formalization in PVF obtained by the present invention, there is no limitation, but it is practicable to prepare those PVF having the degree of formalization of more than approximately 30 molar percent, which is the upper limit of degree of formalization in the PVF obtained by the prior art methods due to the degradation of solubility, cross-linkage between molecules formed at said degree of formalization. Further, the process is also suitable for preparing PVF having degree of formalization of from 50 to 90 molar precent.

In another embodiment of the present invention, it is also practicable to conduct the outset of the formalization reaction by a prior art method and then to introduce by-valent or tri-valent metal chloride therein, so as to complete the latter half of the formalization in the presence of said metal chloride. For instance, the outset of the formalization is conducted in a reaction system which is composed of PVA, formalization agent, formalization catalyzer and water, just like in the prior art methods, and then the metal chloride is introduced therein, and thereafter the latter half of the reaction is continued to complete the formalization reaction.

As described above, the process of the present invention is an independent formalization different from the prior arts wherein PVF having an improved solubility for various solvents and an increased degree of formalization or the solution thereof to produce the shaped articles such as filament, film and cellulose product can be obtained easily.

The following examples will more fully illustrate the manner of carrying out the present invention.

EXAMPLE 1

The formalization reaction was carried out in a system consisting of PVA, formaldehyde, hydrochloric acid, zinc chloride and water by a weight ratio of 10:6:10:30:40, respectively. In the practical operation, water, PVA, zinc chloride and formaldehyde were mixed and then the mixture was heated up to a temperature of 60° C. to dissolve the ingredients completely. Concentrated hydrochloric acid was added to said solution and the formalization reaction was conducted at a temperature of 60° C. under agitation for 8 hours. The reaction was carried out in a phase condition of consistent and complete solution, namely of consistent and completely homogeneous system. The resultant PVF solution after formalization was introduced little by little in the water at a temperature of 60° C. under vigorous agitation to coagulate PVF. The coagulated PVF was washed with hot water thoroughly and dried, and thereafter it was crushed to obtain white and powdery PVF. The resultant PVF had a very high degree of formalization corresponding to 88.2 molar percent, and it was completely dissolved into all of the following solvents: an aqueous solution of thiocyanate consisting of sodium thiocyanate, water and methanol in a ratio of 55:35:10 by weight, a concentrated aqueous solution of a surfactant such as sodium stearate of 50% by weight, a solvent consisting of ethylenediamine, dimethyl formamide, dimethyl sulfoxide or dimethyl formamide and water in a ratio of 80:20 by weight, a solvent consisting of dioxane and water in a ratio of 80:20 by weight, and a solvent consisting of tetrahydrofuran and water in a ratio of 70:30 by weight.

On the other hand, PVF was produced in a conventional manner for a comparison. The formalization reaction was carried out in a system composed of PVA, hydrochloric acid, formaldehyde and water in a ratio of 10:12:10:68 by weight. The reaction system was a complete homogeneous system in the outset of the reaction period, but, as the reaction proceeded, PVF was separated gradually. Accordingly, in the latter half of the reaction period, the reaction was conducted in a heterogeneous system. The reaction was carried out at a temperature of 60° C. under agitation for 4 hours. The coagulated PVF was washed with water thoroughly and dried, and thereafter it was crushed to obtain white and powdery PVF. The resultant PVF, obtained by the prior art method, had a degree of formalization of 77.4 molar percent, which was rather lower as compared with the reaction condition. Moreover, the resultant PVF was not dissolved by any of the aforementioned solvents such as aqueous solution of thiocyanates, concentrated aqueous solution of surfactant, a solvent consisting of ethylenediamine, dimethyl formamide, dimethyl sulfoxide, dioxane or tetrahydrofuran.

EXAMPLE 2

According to the procedure in Example 1, the formalization reaction was carried out in a system composed of PVA, paraformaldehyde, hydrochloric acid, aluminum chloride and water at a ratio of 10:4:10:26:50 by weight at a temperature of 60° C. for 8 hours while agitating. The reaction was conducted in a consistent and complete homogeneous system. After the reaction, the resultant solution was introduced in hot water to coagulate PVF completely, and then it was washed, dried and crushed to obtain white and powdery PVF solid. The resultant PVF had a degree of formalization of 75.6 molar percent, and it exhibited an improved solubility for the various solvents described in Example 1.

EXAMPLE 3

According to the procedure in Example 1, the formalization reaction was carried out in a system composed of PVA, formaldehyde, hydrochloric acid, stannous chloride and water at a ratio of 10:5:10:25:50 by weight. The reaction was conducted in a complete homogeneous system in the first half of the reaction but, in the latter half thereof the reaction was conducted in partially homogeneous and partially heterogeneous system, wherein a part of the formed PVF was separated and another part was present in the solution. After the reaction, whole of the system was introduced in hot water to coagulate the formed PVF completely, which was then washed, dried and crushed to obtain granular solid PVF. The resultant PVF had a degree of formalization of 82.4 molar percent, and it had an improved solubility for the various solvents described in Example 1.

EXAMPLE 4

The formalization reaction was carried out in a system composed of PVA, formaldehyde, hydrochloric acid, magnesium chloride and water in a ratio of 10:5:10:20:55 by weight. The reaction was conducted in a completely homogeneous system in the first half and in a completely heterogeneous system in the latter half. The resultant PVF had a degree of formalization of 78.1 molar percent and an improved solubility.

EXAMPLE 5

The formalization reaction was carried out in a system composed of PVA, formaldehyde, hydrochloric acid, ferrous chloride and water in a ratio of 10:5:10:20:55 by weight. In the first half, the reaction was conducted at a temperature of 40° C. for 2 hours. The reaction was carried out in a completely heterogeneous system throughout the whole period. The resultant PVF after the reaction had a degree of formalization of 79.7 molar percent and a good solubility.

EXAMPLE 6

The formalization reaction was carried out in a system composed of PVA, formaldehyde, hydrochloric acid, calcium chloride and water in a ratio of 10:3:8:20:59 by weight. In the practical operation, PVA, formaldehyde, hydrochloric acid and water were mixed at first and the formalization reaction was conducted in a heterogeneous system at a temperature of 45° C. for 2 hours. After the addition of calcium chloride, the reaction was continued at a temperature of 60° C. for 3 hours to complete the formalization reaction. The reaction was carried out in a phase condition of completely heterogeneous system throughout the whole period. After the reaction, the resultant PVF was washed thoroughly and dried. The resultant PVF had a degree of formalization of 68.5 molar percent and a good solubility.

EXAMPLE 7

The formalization reaction was carried out in a system composed of PVA, formaldehyde, hydrochloric acid, barium chloride and water in a ratio of 10:5:8:15:62 by weight. The formalization reaction was carried out in a completely heterogeneous system according to the procedure of Example 6. The resultant PVA had a degree of formalization of 74.8 molar percent exhibited good solubilities for various kinds of solvents.

EXAMPLE 8

According to the procedure in Example 1, the formalization reaction was carried out in a system composed of PVA, paraformaldehyde, hydrochloric acid, zinc chloride, methanol and water in a ratio of 10:5:7:30:8:40 by weight. The reaction was conducted in a phase condition of completely homogeneous system throughout the reaction period. After the reaction, the resultant solution was introduced in an aqueous solution containing 10% of zinc chloride and 1% of hydrochloric acid to obtain solid PVF by coagulation. The obtained PVF had a degree of formalization of 80.8 molar percent and exhibited elevated solubilities for various kinds of solvents.

EXAMPLE 9

The formalization reaction was conducted at a temperature of 60° C. for 2 hours in a system composed of PVA, formaldehyde, hydrochloric acid and water in a ratio of 10:5:10:60 by weight. Then, after the addition of 40 parts by weight of zinc chloride, the reaction was continued at a temperature of 60° C. for 2 hours to complete the formalization. The reaction was conducted in a complete homogeneous system at the outset, and thereafter a part of PVF was separated. But, after the addition of zinc chloride, the mixture was again brought to a phase condition of complete homogeneous system. After the reaction, the PVF solution was introduced in hot water at a temperature of 90° C. which contained 10% of zinc chloride and 1% of hydrochloric acid, under vigorous agitation to coagulate PVF, and a granular PVF was obtained. The resultant PVF had a degree of formalization of 84.8 molar percent and good solubilities for various kinds of solvents.

EXAMPLE 10

The PVF solution obtained by the invention described in Example 1 was directly subjected to a wet spinning method by means of the nozzle having 0.01 mm. dia. of 100 holes and an aqueous solution containing 10% by weight of zinc chloride and 1% by weight of hydrochloric acid as a coagulating bath. The spinning step was conducted in a good condition at a spinning velocity of 20 m./min. It was then subjected to a stretching step at a ratio of 2 times as length in hot water of 70° C. The filament after washed was taken up on the bobbin at a velocity of 60 m./min.

The solution prepared according to the above method can be used directly for the production of shaped articles such as a spinning solution.

What we claim is:

1. A process for preparing polyvinyl formal which comprises conducting a formalization reaction by reacting polyvinyl alcohol and a source of formaldehyde in an acidic aqueous medium containing at least one metal chloride selected from the group consisting of zinc chloride, aluminum chloride, calcium chloride, ferrous chloride, ferric chloride, cupric chloride, stannous chloride and magnesium chloride; the product having a degree of formalization of between 50 and 90 molar percent and the metal chloride being utilized in an amount between 15 and 50% by weight.

2. A process according to claim 1, wherein the metal chloride is zinc chloride.

References Cited

UNITED STATES PATENTS

| 2,609,347 | 9/1952 | Wilson | 260—2.5 |
| 2,384,034 | 9/1945 | Johnson. | |
| 2,422,754 | 6/1947 | Stamatoff. | |
| 2,862,908 | 12/1958 | Jones et al. | |
| 3,101,991 | 8/1963 | Fukushima et al. | |

OTHER REFERENCES

Walker, J. R., Formaldehyde. N.Y., Reinhold, 1964, 3rd edition, p. 271.

HAROLD D. ANDERSON, Primary Examiner

L. M. PHYNES, Assistant Examiner

U.S. Cl. X.R.

260—29.6; 264—210, 178